Jan. 20, 1959 E. W. GREENFIELD ET AL 2,870,311
ELECTRICAL CONDUCTOR AND SYSTEM
Filed Dec. 19, 1955 2 Sheets-Sheet 1
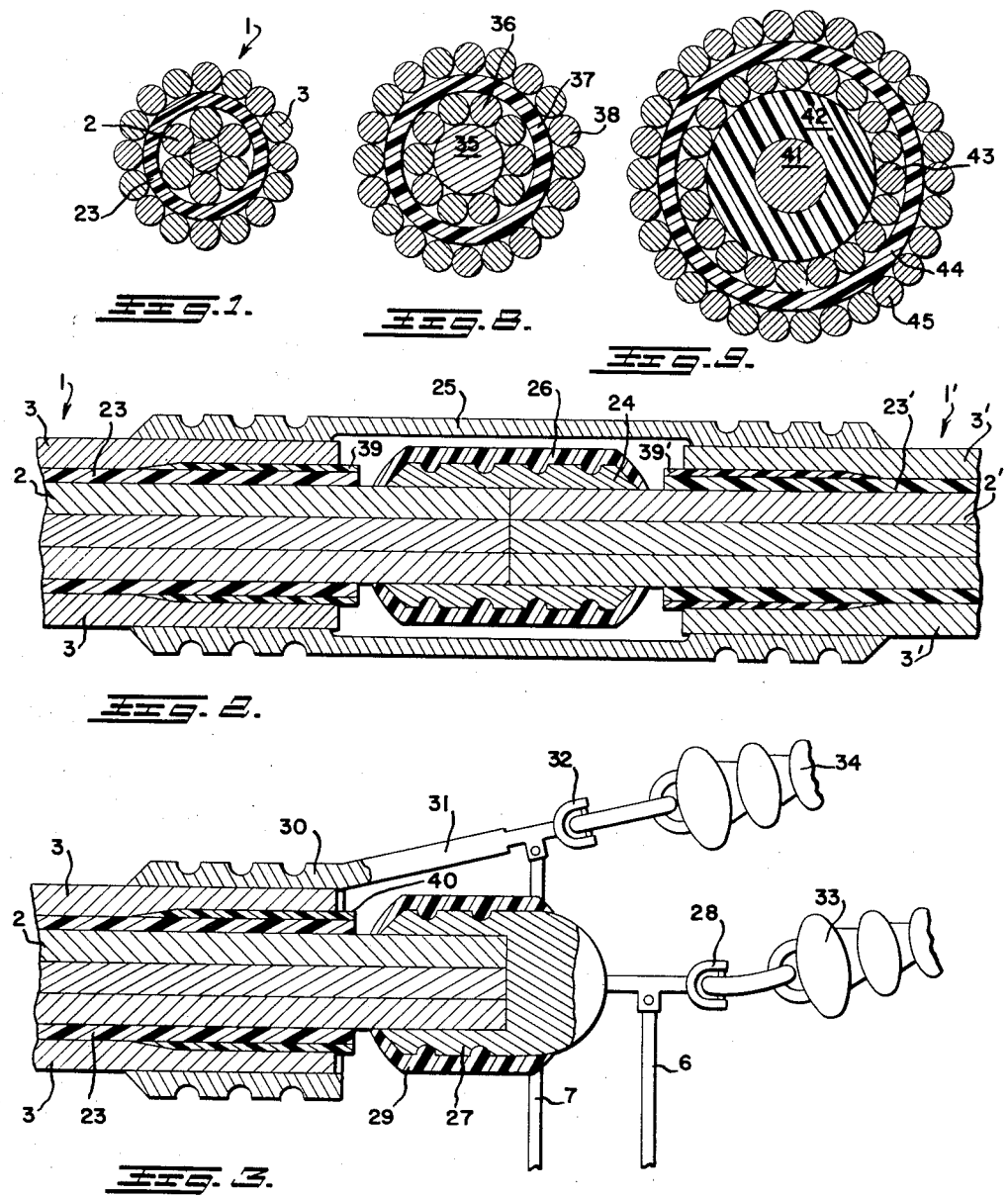
INVENTORS
EUGENE W. GREENFIELD
LUDWIG F. ROEHMANN
BY James E. Toomey
ATTORNEY

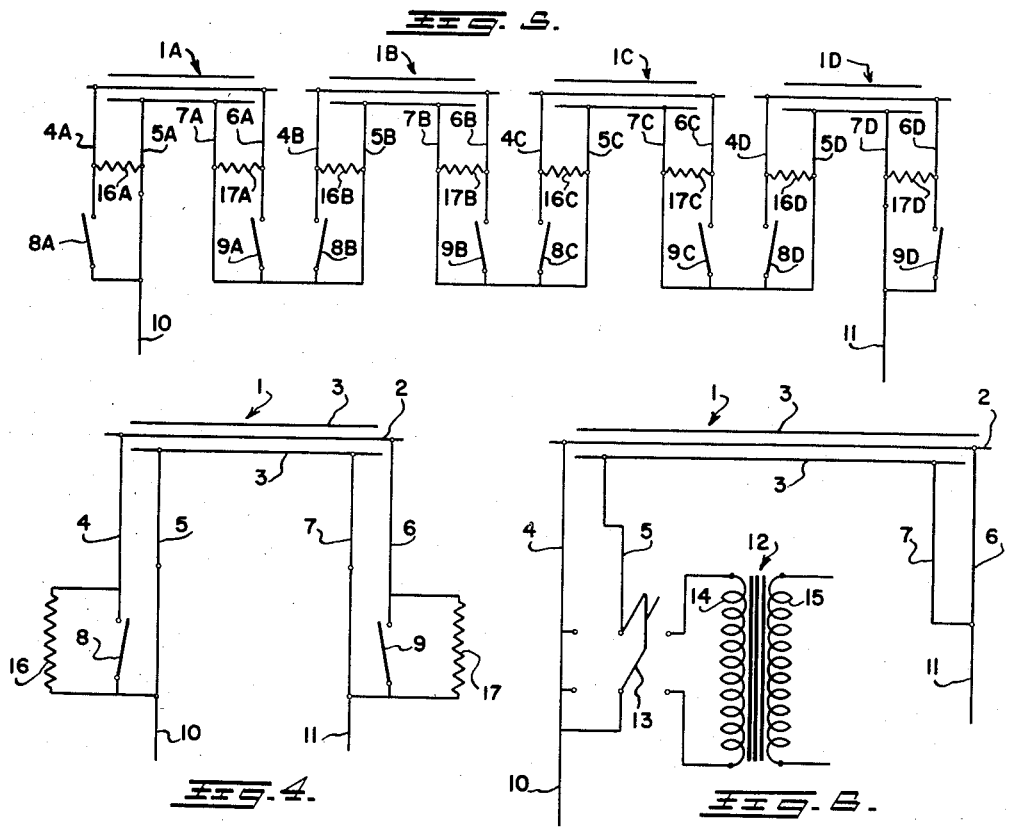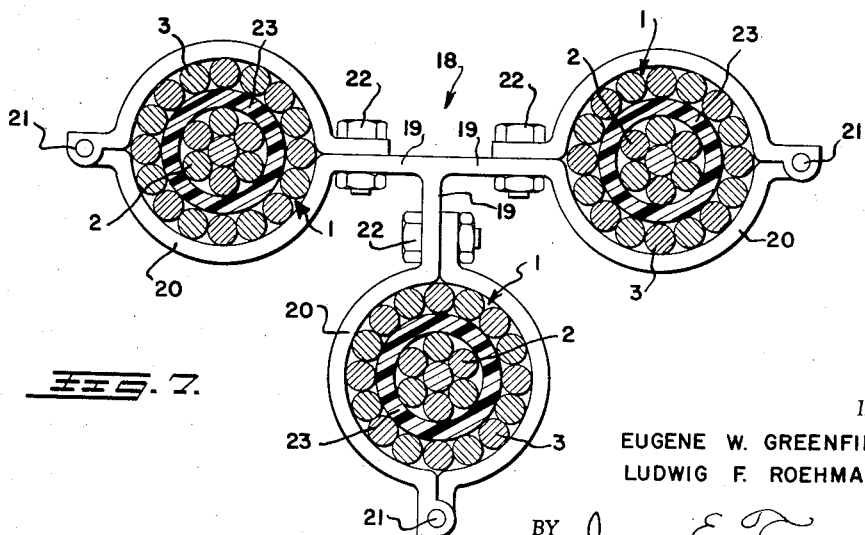

United States Patent Office 2,870,311
Patented Jan. 20, 1959

2,870,311

ELECTRICAL CONDUCTOR AND SYSTEM

Eugene W. Greenfield and Ludwig F. Roehmann, Spokane, Wash., assignors to Kaiser Aluminum & Chemical Corporation, Oakland, Calif., a corporation Application December 19, 1955, Serial No. 553,757

10 Claims. (Cl. 219—19)

This invention relates to electrical transmission cables. More particularly, this invention relates to an electrical transmission cable, a transmission system utilizing such cable, and a method which is effective to provide ready removal of ice incrustations which may form on such cable during use.

In the operation of large transmission lines in regions where sleet and other weather conditions cause ice to form on the line, the weight of such ice incrustations added to the effects of wind and conductor tensions may cause the cable to sag excessively or break. These problems are present with regard to single conductor cables and to bundle conductor cables, the latter of which comprise two or more sub-conductors which are spaced or separated to provide better electrical characteristics. The conventional practice for avoiding these serious occurrences generally comprises mechanically vibrating the conductors or passing high or short circuit currents through the line. These currents heat the lines sufficiently to prevent heavy ice formation and to cause ice already present to fall off. For this purpose either the normal supply transformers are used in special connections or current from special de-icing transformers is superimposed upon the line current. Such practice possesses certain inherent disadvantages particularly with regard to current load. For example, in large conductors the line resistance can be so low that an enormous amount of power is required to raise the temperature sufficiently to cause the ice to fall off. Often the current supplying capacity of the transmission system is insufficient to accomplish this task and exceedingly large and expensive auxiliary transformers are required.

Accordingly, it is an object of this invention to provide an electrical transmission cable structure, a transmission system using such cable structure, and a method which eliminates or substantially reduces many of the disadvantages of the prior art techniques.

A further object of this invention is to provide a system for the removal of ice incrustations from electrical transmission cables which does not require expensive auxiliary equipment and an excessive amount of power for such removal.

A further object of this invention is to provide a novel cable especially adapted for the removal of ice incrustations therefrom which does not require an excessive amount of power for such removal.

It is a further object of this invention to provide a novel expanded core cable especially adapted for the removal of ice incrustations therefrom which does not require an excessive amount of power for such removal.

It is also an object of this invention to provide means for splicing and for dead ending the novel cables of this invention.

It is a further object of this invention to provide a novel bundle conductor especially adapted for the removal of ice incrustations therefrom which does not require an excessive amount of power for such removal.

It is a further object of this invention to provide a novel method for the removal of ice incrustations from cable employed for the transmission of electrical energy.

It is a further object of this invention to provide a system for the transmission of electric current characterized by ease of removal of ice incrustations from the surface of cables employed therein.

Further objects and advantages of this invention will be apparent from the following description thereof.

In order to achieve the objectives recited above, a cable structure is employed which comprises an inner conductor, a layer of poorly conducting material closely surrounding said inner conductor and an outer conductor closely surrounding said layer of poorly conducting material. The term poorly conducting material as used herein refers to material having low conductance including zero conductance material, e. g. insulation. In normal operation of the cable the outer conductor and the inner conductor are connected in parallel for conducting current. However, when ice forms on the cable and removal thereof is essential a low voltage high amperage current can be directed entirely through the outer conductor thereby melting the ice with a minimum amount of current. It is apparent that substantially less current need pass through the outer conductors alone in order to heat up the cable surface for melting ice than would be required if the current had to be passed through the entire conductor. In most instances the objects can be accomplished without removing the line from service by passing the full line current through the outer conductor rather than passing it through the outer and inner conductors in parallel. Alternately de-icing current may be provided by a small de-icing transformer or by special connectors to the regular transformers. Suitable switching stations located at strategic points along the transmission line will serve to control the sections of the line to be de-iced.

In the accompanying drawings wherein identical parts in the various views are indicated by identical numerals:

Figure 1 is a transverse cross section of a cable embodying the principles of this invention.

Figure 2 is a longitudinal cross section of the cable shown in Figure 1 and showing a means for splicing the cable.

Figure 3 is a longitudinal cross section of the cable shown in Figure 1 and showing a means for dead ending the cable.

Figure 4 is a schematic representation of one means for connecting the cable of this invention for the dual purpose of current transmission and de-icing.

Figure 5 is a schematic representation of a means for connecting a transmission line comprising a plurality of sections of cables of this invention for the dual purpose of current transmission and independently de-icing individual cable sections.

Figure 6 is a schematic representation of another means for connecting a cable of this invention for the dual purpose of current transmission and de-icing.

Figure 7 is a transverse cross section of a bundle conductor employing three sub-conductors adapted for this invention.

Figure 8 is a transverse cross section of an ACSR type cable adapted for this invention.

Figure 9 is a transverse cross section of an expanded core type cable adapted for this invention.

With reference more particularly to the drawings, this invention relates to a cable comprising an outer conductor and an inner conductor separated by a layer of poorly conducting material for the dual purpose of transmitting current and melting ice incrustations from the surface of such cable by passing melting current through the outer conductor only. One cable structure embodying the principles of this invention is illustrated by Figure 1 wherein cable 1 comprises an inner conductor 2, preferably stranded, a layer 23 of poorly conducting material closely surrounding said inner conductor and an outer conductor 3, also preferably stranded, closely surrounding layer 23 of poorly conducting material. Suitable materials for layer 23 include varnished cloth tape, varnished glass tape, reinforced rubber tape, polyvinyl chloride tape, or extruded layers of rubber like materials or plastic materials such as polyvinyl chloride, polyethylene, nylon, etc. Since for the application of this invention the voltage differential between the outer conductor 3 and the inner conductor 2 will be zero or some low value, the layer 23 may be thin relative to the thickness of the outer conductor 3 and the inner conductor 2. In addition the material of layer 23 need not be an insulating material, e. g., zero conductance, but may be a material of low conductance. In general the thickness of layer 23 will be less than the thickness of either outer conductor 3 or inner conductor 2. For best results it is preferred that the outer conductor 3 have more than ⅓ but less than ½ of the total conductance of the cable 1. This ratio may be varied not only by the use of different relative cross sectional areas of the outer conductor 3 and the inner conductor 2 but also by using metals of different conductivities or net conductances. For example, in a preferred embodiment of this invention electrical conductor grade aluminum metal (generally referred to as E. C. aluminum) may be used for the inner conductor 2 while an aluminum-magnesium-silicon type ternary aluminum alloy may be employed for the outer conductor 3. The European alloy "Almelec" is representative of such an alloy and is composed of approximately 0.6% silicon, 0.7% magnesium, balance aluminum.

The conductor above described and shown in Figure 1 may be joined or spliced by the means shown specifically in Figure 2. This splice may be of the compression type wherein the inner and outer conductors have separate compression sleeves 24 and 25 respectively. Such compression sleeves are well known to those skilled in the electrical arts and accordingly will not be described in detail.

For application of the splice, the inner conductors 2 and 2' must extend beyond the ends of the respective outer conductors 3 and 3'. An inner sleeve 24 is then placed over the ends of inner conductors 2 and 2', sleeve 24 closely fitting conductors 2 and 2'. With the ends of inner conductors 2 and 2' in contact each with the other the compression sleeve 24 is crimped or compressed to tightly engage the ends of inner conductors 2 and 2'. Next inner sleeve 24 is covered with a layer 26 of poorly conducting material. Suitable materials for layer 26 include varnished cloth tape, varnished glass tape, reinforced rubber tape or extruded layers of rubber-like materials or plastic materials such as polyvinyl chloride, polyethylene, nylon, etc. Next, an outer sleeve 25 is placed over the ends of outer conductors 3 and 3', sleeve 25 closely fitting outer conductors 3 and 3' and bridging the gap between the ends thereof. Outer sleeve 25 is then compressed onto outer conductors 3 and 3' to tightly engage the ends of outer conductors 3 and 3'. Before compressing the outer compression sleeve 25, it is desirable to slide a thin reinforcing tube 39 and 39' of suitable hard material, such as laminated glass bonded with polyester resin, between the outer conductors 3 and 3' and layers 23 and 23'. This will prevent the strands of outer conductor 3 from sinking too deeply into the layers 23 and 23'. With such a joining means the connections or splices should develop the full strength of the entire conductor and yet provide continuous isolation between the two conducting elements.

In order to support the terminal ends of cable 1, suitable dead ending means must be provided. Such dead ending means must provide the necessary holding power as well as electrical isolation of the two conductors 2 and 3. For application of dead ending means the inner conductor 2 must extend beyond the end of the outer conductor 3, as shown in Figure 3 of the drawings. An inner sleeve 27 having a clevis 28 at one end thereof is placed over the end of inner conductor 2, sleeve 27 closely fitting conductor 2. Sleeve 27 is then crimped or compressed to tightly engage the end of inner conductor 2. As in the case of the above defined splice, inner sleeve 27 is covered with layer 29 of poorly conducting material. Next, an outer sleeve 30 is placed over the end of outer conductor 3 closely fitting conductor 3. Sleeve 30 is then crimped or compressed to tightly engage the end of outer conductor 3. Outer sleeve 30 has an offset arm 31 which in turn has a clevis end 32. As in the case of the splice, an insulating tube 40 of suitable hard material such as laminated glass bonded with polyester resin may be placed between the outer conductor 3 and layer 23 to prevent the outer strands of conductor 3 from sinking too deeply into layer 23. Clevis ends 28 and 32 are each bolted to an insulator string 33 and 34, respectively, which in turn are fastened to suitable support means not shown. The insulator strings are insulated from one another for several thousand volts. A jumper 7 is connected to outer compression sleeve 30 while another jumper 6 is connected to inner compression sleeve 27. These jumpers carry the current from the outer conductor 3 and the inner conductor 2 respectively to the respective conductors of the next cable section of the transmission line or down to a sub-station or switching yard for switching.

Preferred electrical transmission systems of this invention for use with a cable such as cable 1 above described are schematically shown in Figures 4, 5 and 6. Referring now more particularly to Figure 4 which illustrates one such system, cable 1 is shown with inner conductor 2 and outer conductor 3. At the end of cable 1 to the left of the drawing a suitable jumper 4 is connected to inner conductor 2 while a suitable jumper 5 is connected to outer conductor 3. At the other end of cable 1 a jumper 6 is connected to inner conductor 2 and a jumper 7 is connected to outer conductor 3. A feeder line 10 is connected directly to jumper 5 which is connected in turn to the outer conductor 3 while a feeder line 11 at the other end of cable 1 is connected directly to jumper 7 which in turn is connected directly to outer conductor 3. Jumper 4 may be connected to line 10 through switch 8 while jumper 6 may be connected to line 11 through switch 9. For normal operation switches 8 and 9 are closed whereby the current passes in parallel through inner conductor 2 and outer conductor 3. However, when the cable 1 becomes incrusted with ice, switches 8 and 9 may be opened whereby the entire line current passes through outer conductor 3. The resistance of the outer conductor alone is substantially greater than that of the outer conductor and inner conductor connected in parallel and accordingly outer conductor 3 heats up thereby melting the ice. In order to maintain inner conductor 2 at the same potential as outer conductor 3 when switches 8 and 9 are open and prevent arcing, resistances 16 and 17 are provided across switches 8 and 9 respectively. Resistances 16 and 17 are of sufficiently high value to prevent all but a negligible current from passing through inner conductor 2.

While the system of Figure 4 illustrates cable 1 as a single line, in practice an electrical transmission line will generally comprise a series of cable sections. The ends of each section are separated from the next section and supported by a suitable dead ending tower. The ends of adjacent cable sections are generally connected electrically by suitable jumpers. In the application of this invention to such a transmission line it is desirable to be able to pass de-icing current through the outer conductor only of a given cable section independently of the other cable sections in the transmission line. One means for accomplishing this objective would be to employ the switching arrangement illustrated in Figure 5. While a conventional transmission line would generally have more than 4 cable sections, it is believed that Figure 5 adequately illustrates switching arrangements for a transmission line having a plurality of sections. With reference to Figure 5 switches 8A, 9A, 8B, 9B, 8C, 9C, 8D and 9D would be closed for normal operation whereby the current flows in parallel through the inner conductors and the outer conductors of each cable section 1A, 1B, 1C and 1D. However, if a cable section for example, section 1C becomes incrusted with ice, switches 8C and 9C may be opened whereby the entire line current passes through only the outer conductor of cable section 1C. However, the line current would still flow in parallel through both the inner and outer conductors of cable sections 1A, 1B, and 1D. Similarly, if it was desired to de-ice cable section 1A, switches 8A and 9A would be opened. Whichever cable section it is desired to de-ice, it is only necessary to open the respective switches for such cable section while maintaining the switches closed for those cable sections which it is not desired to de-ice. As with the system of Figure 4 resistances 16A, 17A, 16B, 17B, etc. may be provided across switches 8A, 9A, 8B, 9B, etc., respectively to maintain the inner conductor of each cable section at the same potential as the outer conductor when switches 8A, 9A, or 8B, 9B, etc. as the case may be are open.

The above system is particularly desirable where all cable sections do not have ice incrustations, since it is desirable to run the entire line current through the outer conductors of only those sections which have the ice incrustations. Further, even where all cable sections of the transmission line become incrusted with ice it may be desirable to pass the entire line current through the outer conductors only of just a few sections at a time in order to avoid the excessively large voltage drop in the transmission line which would result if the entire line current was passed through the outer conductors only of the entire transmission line.

With reference to Figure 6 a second electrical transmission system suitable for this invention is shown. This system includes a small auxiliary transformer 12 having a primary 15 and a secondary 14 and a double pole, double throw switch 13. In accordance with this system jumpers 6 and 7 at the right hand end of cable 1 are connected together and to a feeder line 11. At the left hand end of cable 1, feeder line 10 is connected directly to jumper 4 while jumper 5 is connected to one pole of the switch 13. The other pole of the switch 13 is connected to line 10. For normal operation, switch 13 is thrown to the left connecting jumper 5 with feeder line 10, while transformer 12 is disconnected from cable 1. With switch 13 in this position the current passes from feeder line 10 through jumpers 4 and 5 and through the inner conductor 2 and the outer conductor 3 in parallel. The current then passes through jumpers 6 and 7 to feeder line 11. When ice incrustations form on the surface of the cable 1, switch 13 may be thrown to the right whereby one end of the transformer secondary 14 is connected to jumper 5 and in turn to outer conductor 3. The other end of transformer secondary 14 is then connected to line 10. When so connected, current from the transformer secondary 14 during ½ cycle passes through jumper 5, outer conductor 3, jumpers 7 and 6, inner conductor 2, jumper 4 and switch 13 to the secondary 14 of transformer 12. On the next half cycle the transformer current travels the same path in the opposite direction. Transformer 12 is a suitable low voltage high amperage transformer which is insulated and operated for full line voltage above ground and which may be phased so as to either work against or to boost the main load current which continues to flow in the inner conductor 2. Alternatively the main load current may be cut off by suitable switching means (not shown) during de-icing.

As with the system of Figure 4 it may be desirable to de-ice only certain sections of a transmission line when employing the system of Figure 6. In such an instance each cable section would be provided with suitable switching arrangements for making proper connections to transformer 12 and a suitable switch would be provided to open or close the connection between jumpers 7 and 6 in order to maintain inner conductor 2 and outer conductor 3, electrically separate during normal operation and to electrically connect the ends of conductors 2 and 3 to provide a return path for the de-icing current as described in connection with Figure 5. Since such a switching arrangement is within the skill of those familiar with the electrical arts a detailed description and drawing is not included.

While three systems for carrying out this invention have been illustrated and specifically described, it is to be distinctly understood that this invention is not limited thereto and that various circuits and switching arrangements may be employed to carry out the principles of this invention, namely, to provide a system whereby a conductor may serve the dual purpose of current transmission and de-icing. While the transformers 12 and 18 and switches 8, 9, 13, 19 and 20 have been shown only schematically such switches are conventional and well known to those skilled in the electrical arts. In accordance with conventional practices in the electrical arts such switches for de-icing purposes can be arranged for manual push button operations or can be made automatic on a time cycle with ice formation initiation.

The electrical transmission cable structure and transmission system of this invention may be applied both to single conductor cables and to bundle conductor cables. The bundle conductor is a cable which generally consists of a bundle of two or more sub-conductors. The sub-conductors in such a bundle are usually spaced or separated to provide desirable electrical characteristics and better transmission line performance, notably less corona loss, less radio and television interference, less reactance and greater load transmission capability. Figure 7 illustrates one construction of a bundle conductor employing three sub-conductors in a triangular configuration. For application of this invention to bundle conductors each sub-conductor 1 of the bundle would be a cable constructed in accordance with this invention such as the cable of Figure 1 comprising an inner conductor 2, a layer 23 of poorly conducting material and an outer conductor 3. Each cable 1 is spaced from the other by a plurality of spacers 18 of suitable material which may be conducting material such as 75S aluminum positioned at frequent intervals along cables 1. Spacers 18 are composed of three arms 19. The extremity of each arm 19 has a clamp portion 20, closely surrounding each cable 1. Each clamp portion 20 may be hinged as at point 21, and held in clamping position by suitable means such as a bolting means 22.

The principle of this invention may also be applied to ACSR (aluminum conductor steel reinforced) as shown in Figure 8, wherein there is provided a central core 35 of material having high tensile strength, such as steel. About core 35 is stranded a layer 36 of conductor material such as aluminum having a higher electrical conductivity than the material of core 35. About layer 36 a suitable layer 37 of poorly conducting material is applied over the outside of layer 36 of conductor material. About layer 37 is provided an outer layer 38 of conductor material. As with the cable of Figure 1, the cable so formed would preferably have greater than ⅓ but less than ½ of the total conductance of the cable in the outer layer 38.

A splice for a cable of the type shown in Figure 8 would be substantially the same as that for the embodiment of Figure 1, which splice is shown in Figure 2. However, three compression sleeves would be required, one for steel core 35, one for inner conductor layer 36 and one for outer conductor layer 38.

Dead ends for the cable of Figure 8 would be substantially the same as the dead ends for the cable of Figure 1. However, similar to the splice, three compression sleeves would be required.

It is conventional in the electric cable art to minimize corona loss by expanding the diameter of transmission cables. In general, expanded core type cables have a steel core surrounded by paper filler material to expand the diameter of the cable. The paper filler is then covered with a layer of suitable material such as an extruded tube of polyethylene which protects the paper filler and the steel core from moisture. The polyethylene tube is then covered with several layers of conductor material. Such cable may embody the principles of this invention by placing the moisture resistant tube between layers of the conductor material. Such an adaptation is shown in Figure 9 wherein a central core 41 of material having high tensile strength such as steel passes through the center of the cable. Closely surrounding core 41 is a thick layer of suitable filler material 42 such as paper. About filler material 42 is stranded a layer 43 of conductor material such as aluminum generally having a higher electrical conductivity than core 41. Closely surrounding layer 43 is a tube of poorly conducting moisture resistant material 44. About material 44 is an outer layer of suitable conductor material 45.

As with the previous embodiments of this invention it is preferred that the conductance of the outer layer of conductor material 45 should range greater than ⅓ but less than ½ the total conductance of the cable.

Splices and dead ends for a cable of the type shown in Figure 9 would be substantially the same as for the cable of Figure 1 with the exception that similar to the cable of Figure 8, three compression sleeves would be required rather than two.

While there has been shown and described hereinabove the present preferred embodiments of this invention, it is to be understood that the invention is not limited thereto and that various changes, alterations and modifications can be made thereto without departing from the spirit and scope thereof as defined in the appended claims, wherein what is claimed is:

1. A dual purpose electrical transmission cable for conducting electricity and for removing ice incrustations from the outer surface of said cable comprising an inner conductor, a layer of poorly conducting material closely surrounding said inner conductor and an outer conductor closely surrounding said layer of poorly conducting material, said layer of poorly conducting material having a thickness less than the thickness of said conductor layers, said outer conductor having a conductance of greater than ⅓ and less than ½ the total conductance of the cable, said outer conductor adapted to have passed therethrough a low voltage high amperage current thereby heating said conductor for melting the ice incrustations therefrom.

2. A dual purpose electrical transmission cable for conducting electricity and for removing ice incrustations from the outer surface of said cable comprising a central metallic core of high tensile strength, a layer of conductor material having higher electrical conductivity than said central core and closely surrounding said central core, a layer of poorly conducting material closely surrounding said layer of conductor material and an outer layer of conductor material closely surrounding said layer of poorly conducting material, said layer of poorly conducting material having a thickness less than the thickness of either of said conductor layers and said outer layer of conductor material having a conductance greater than ⅓ and less than ½ of the total conductance of the cable, said outer layer of conductor material adapted to have passed therethrough a high amperage current thereby heating said outer conductor for melting the ice incrustations therefrom.

3. A dual purpose electrical transmission cable for conducting electricity and for removing ice incrustations from the outer surface of said cable comprising a central metallic core of high tensile strength, a relatively thick layer of filler material closely surrounding said central core, a layer of conductor material having a higher electrical conductivity than said central core closely surrounding said filler material, a layer of poorly conducting moisture proof material closely surrounding said layer of conductor material, and an outer layer of conductor material closely surrounding said layer of poorly conducting moisture proof material, said layer of poorly conducting moisture proof material having a thickness less than the thickness of either of said layers of conductor material, the conductance of said outer layer of conductor material being greater than ⅓ and less than ½ the total conductance of the cable, said outer layer of conductor material adapted to have passed therethrough a high amperage current thereby heating said outer layer of conductor material for melting the ice incrustations therefrom.

4. A bundle conductor comprising a plurality of sub-conductors, spacer means positioned at frequent intervals along said sub-conductors for maintaining said sub-conductors a given distance from each other, each of said sub-conductors consisting of a dual purpose cable for conducting electricity and removing ice incrustations from the outer surface of said cable and comprising an inner conductor, a layer of poorly conducting material closely surrounding said inner conductor and an outer conductor closely surrounding said poorly conducting material, the thickness of said layer of poorly conducting material being less than the thickness of either of said conductors, the conductance of said outer conductor being less than the conductance of said inner conductor and ranging from about ⅓ to ½ of the total conductance of said sub-conductor, said outer conductor adapted to have passed therethrough a high amperage current thereby heating said outer conductor for melting the ice incrustations therefrom.

5. An electrical transmission system characterized by ease of removal of ice incrustations from the surface thereof including in combination an electrical transmission cable comprising an inner conductor, a layer of poorly conducting material closely surrounding said inner conductor and an outer conductor closely surrounding said poorly conducting material, said layer of poorly conducting material having a thickness less than the thickness of either of said conductors, the conductance of said outer conductor being greater than ⅓ and less than ½ the total conductance of the cable, means for supplying current to each of said conductors such that the current passes through said conductors in parallel, and means for supplying to said outer conductor a low voltage high amperage current to heat said outer conductor to a temperature sufficient to remove ice incrustations formed on the cable.

6. An electrical transmission system characterized by ease of removal of ice incrustations from the surface thereof including in combination an electrical transmission cable comprising an inner conductor, a layer of poorly conducting material closely surrounding said inner conductor and an outer conductor closely surrounding said poorly conducting material, said outer conductor having a lower conductance than said inner conductor, means for supplying current to each of said conductors such that the current passes through said conductors in parallel, auxiliary transformer means for supplying to said outer conductor a low voltage high amperage current to heat said outer conductor to a temperature sufficient to remove ice incrustations formed on the cable and switching means provided to connect said transformer means to said outer conductor.

7. An electrical transmission system characterized by ease of removal of ice incrustations from the surface thereof including in combination a series of lengths of electrical transmission cable each comprising an inner conductor, a layer of poorly conducting material closely surrounding said inner conductor and an outer conductor closely surrounding said poorly conducting material, said outer conductor having a lower conductance than said inner conductor, means for splicing said cable lengths together, means for dead ending the terminal portions of a cable, means for supplying current to said inner and outer conductors such that the current passes through said conductors in parallel, and means for supplying to said outer conductor a low voltage high amperage current to heat said outer conductor to a temperature sufficient to remove ice incrustations formed on the cable.

8. The electrical transmission system of claim 7 wherein said poorly conducting material has a thickness less than the thickness of either of said conductors and said outer conductor has a conductance greater than ⅓ but less than ½ the total conductance of the cable.

9. The electrical transmission system of claim 7 wherein the ends of the inner conductors of said lengths of cable to be joined extend beyond the respective ends of the outer conductors and said splicing means comprises an inner sleeve which closely fits over said ends of said inner conductors, said sleeve being in tight intimate contact with said ends of said inner conductors, a layer of poorly conducting material closely surrounding said inner sleeve, an outer sleeve which closely fits over the ends of said outer conductors and bridges the gap between the ends of said outer conductors which results from extending the ends of said inner conductors beyond the ends of said outer conductors, said outer sleeve being in tight intimate contact with the ends of said outer conductors, a layer of hard material being placed between the end of each of said outer conductors and the layer of poorly conducting material which closely surrounds each of said inner conductors, said layer preventing the outer conductors from being compressed into said layer of poorly conducting material closely surrounding said inner conductors.

10. The electrical transmission system of claim 7 wherein the terminal end of said inner conductor extends beyond the terminal end of said outer conductor and said dead ending means comprises an inner sleeve which closely fits over an end of said inner conductor and which has a clevis at the end opposite the end fitting over said inner conductor, said inner sleeve being in tight engagement with said end of said inner conductor, a layer of poorly conducting material closely surrounding said inner sleeve, an outer sleeve which closely fits over an end of said outer conductor and has an offset arm and clevis at the end opposite the end which closely fits over the end of said outer conductor, said outer sleeve being in tight engagement with the end of said outer conductor, a layer of hard material provided between the end of said outer conductor and the layer of poorly conducting material surrounding said inner conductor, each of said clevis ends being affixed to an insulator string which in turn is affixed to a supporting means.

References Cited in the file of this patent
UNITED STATES PATENTS

| | | |
|---|---|---|
| 557,258 | Delany | Mar. 31, 1896 |
| 743,331 | Ries | Nov. 3, 1903 |
| 2,075,996 | Noyes | Apr. 6, 1937 |
| 2,118,630 | Waldron | May 24, 1938 |
| 2,650,948 | Findlay | Sept. 1, 1953 |
| 2,662,156 | Potter | Dec. 8, 1953 |
| 2,731,510 | Brazier | Jan. 17, 1956 |

FOREIGN PATENTS

| | | |
|---|---|---|
| 483,274 | Great Britain | Apr. 12, 1938 |